United States Patent [19]

Shimizu et al.

[11] 4,214,304
[45] Jul. 22, 1980

[54] MULTIPROGRAMMED DATA PROCESSING SYSTEM WITH IMPROVED INTERLOCK CONTROL

[75] Inventors: Tsuguo Shimizu; Tsuguo Matsuura, both of Hadano, Japan

[73] Assignee: Hitachi, Ltd., Tokyo, Japan

[21] Appl. No.: 954,215

[22] Filed: Oct. 24, 1978

[30] Foreign Application Priority Data

Oct. 28, 1977 [JP] Japan .............................. 52-128703

[51] Int. Cl.² ........................ G06F 13/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,445,819 | 5/1969 | Cooper et al. | 364/200 |
| 3,528,062 | 9/1970 | Lehman et al. | 364/200 |
| 3,761,883 | 9/1973 | Alvarez et al. | 364/200 |
| 3,814,919 | 6/1974 | Repton et al. | 364/200 X |
| 4,050,059 | 9/1977 | Williams et al. | 364/200 |
| 4,073,005 | 2/1978 | Parkin | 364/200 |

Primary Examiner—Joseph F. Ruggiero
Attorney, Agent, or Firm—Craig & Antonelli

[57] ABSTRACT

A multiprogrammed data processing system with reduced processing time for interlock instructions compares the first partial address contained in a request with a corresponding first partial address of an interlocked address in a first comparator when a main storage control unit receives the request from one of central processing units. The main storage control unit sends the request to a main memory in response to non-coincidence signal from the first comparator.

In response to a coincidence signal from the first comparator, the main storage control unit compares a second partial address contained in the request with a corresponding second partial address of the interlocked address. The main storage control unit sends the request in response to a non-coincidence signal from the second comparator.

16 Claims, 13 Drawing Figures

MULTIPROGRAMMED DATA PROCESSING SYSTEM WITH IMPROVED INTERLOCK CONTROL

BACKGROUND OF THE INVENTION

The present invention relates to a multiprogrammed data processing system which has the function of interlocking a main storage unit. More particularly, it is directed to a multiprogrammed data processing system which includes a plurality of central processing units (CPUs) that access a main storage unit in common.

Where data stored in a main storage unit is processed by a plurality of CPUs which use the main storage unit in common, it is necessary to ensure that while one CPU is operating with the common data, every other CPU be prevented from improperly rewriting the data.

Hereinafter there will be explained problems in the case where data A stored in a main storage unit is referenced in common in a multiprogrammed data processing system wherein a $CPU_1$ and a $CPU_1'$ accessed the main storage unit in common.

In order to inhibit the common data A from being referenced simultaneously by the two CPUs, data (termed "lock data") B indicating that either CPU is referencing the data A is stored in the main storage unit in advance.

When one central processing unit $CPU_1$ is to execute a data processing operation with the common data A, the lock data B is checked prior to the execution. If it is indicated in the lock data that the other central processing unit $CPU_1'$ is not using the data A, $CPU_1$ is permitted to refer to the data A, and the use by $CPU_1$ is indicated in the lock data B. While $CPU_1$ is performing the processing operation with the data A, reference from $CPU_1'$ to the data A is inhibited.

The CPU in the multiprogrammed data processing system consists of an instruction unit, an execution unit, and a storage control unit.

The main storage unit consists of a main storage controller and a main storage.

In a multiprogrammed data processing system, an instruction for checking the lock data B is prepared. (For example, in the "IBM System/370" or a computer having the same architecture, TEST AND SET (TS) instruction corresponds thereto.) The TS instruction is decoded by the instruction unit within the CPU, and a read request for the lock data B is issued to the storage control unit within the CPU. Upon reading out the data B from the main storage controller, the storage control unit transmits it to the execution unit within the CPU, whereupon the execution unit checks the lock data B. Thereafter, a write request for renewed lock data is issued from the execution unit via the storage control unit to the main storage controller.

It takes a considerable period of time for one CPU to read, check, and rewrite the lock data. During this time, there is the possibility that the other CPU will issue a request for altering the lock data and that the main storage unit will accept and execute this request.

In order to prevent such a state to occur, the prior art adopts a measure wherein when one CPU has started the execution of the TS instructions, the other CPU is interlocked with the main storage so as to prevent the other CPU from referencing the main storage.

As methods for applying the interlock with the main storage, there are:

(1) a method wherein the entire main storage is interlocked, and (2) a method wherein a certain limited region including the lock data is interlocked (Published Unexamined Japanese patent application No. 51-107042).

With the method (1), even if the other CPU issues reference requests to regions different from the region including the lock data, they are all refused and the other CPU is temporarily idle. This is not desirable from the viewpoint of efficiency of system performance. In large-sized computers, in recent years, the reference time to the main storage is an important factor which determines the performance of the system. It is, therefore, desirable to unnecessarily avoid putting the main storage into a state in which it cannot be referenced.

With the method (2), the above problem does not arise. However, each time the main storage is referenced, whether or not the reference is to the region including the lock data must be determined.

In synchronous computers, one operating cycle is usually composed to two timings $T_0$ and $T_1$, and the timing at which the request is issued to the main storage is predetermined. In the processing of any request which is not the interlock request, the request is decoded at the timing $T_0$, the priority level is subsequently determined at the timing $T_1$, and the request is issued to the main storage at the next timing $T_0$. The request is accordingly issued every cycle that is determined by the interval of the generation of the timing $T_0$. However, when the processing in which whether or not the reference is to the region including the lock data is judged is added for every reference to the main storage, the request is decoded at the timing $T_0$, the priority level is determined at the subsequent timing $T_1$, the judgement of the lock data is initiated at the next timing $T_0$, and the request is issued to the main storage at the next timing $T_1$. In the synchronous computers, the succeeding decode request can be started only at the next timing $T_0$. Therefore, the request to the main storage is issued at the timing $T_1$ for an interval of two cycles and the throughput decreases to half.

The present invention has for an object the provision of a multiprogrammed data processing system, wherein the interlock of a main storage is applied to a region limited and wherein in checking if a reference to the main storage from another CPU is to the interlock region, the period of time required for the check is shortened to increase the speed of a request for reference to the main storage.

BRIEF SUMMARY OF THE INVENTION

The multiprogrammed data processing system according to the invention compares an address signal within a request sent from a CPU and an interlock address already interlocked. Two comparators for detecting the presence of coincidence between both these addresses are disposed within a main storage unit. That is, a first comparator for comparing a first part of the address within the request and a corresponding first part of the interlock address and second comparator for comparing a second part of the address within the request and a corresponding second part of the interlock address are disposed within the main storage unit.

When the main storage unit has received a new request from the CPU, the new request is stored in a request storage register within the main storage unit. In parallel therewith, the first part of the address signal of the new request is sent to the first comparator and is compared with the first part of the interlock address. Upon the condition that the output of the first comparator is not indicative of the coincidence, the main storage unit transmits the request to the main storage.

When the output of the second comparator is indicative of the coincidence, the main storage unit transmits the received request to the main storage upon condition that the result of the comparison in the second comparator between the second part of the address signal of the received request and the second part of the interlock address is not indicative of coincidence.

In this manner, at the reception of the new request, the comparisons between the parts of the interlock address and the parts of the request address are carried out in parallel with the usual operations of reception, decoding, and selection of the request. Accordingly, granting that the comparisons take some length of time, the predetermined request can be selected by bank control circuit upon elapse of a period of time required for the usual operations described above. In substance, accordingly, the processing time does not increase due to the comparisons.

Further, since the comparisons are made for the parts of the addresses, a shorter period of time suffices than in the case of comparing the whole addresses.

DETAILED DESCRIPTION OF THE PREFERRED EMBODIMENTS

Figure 1:
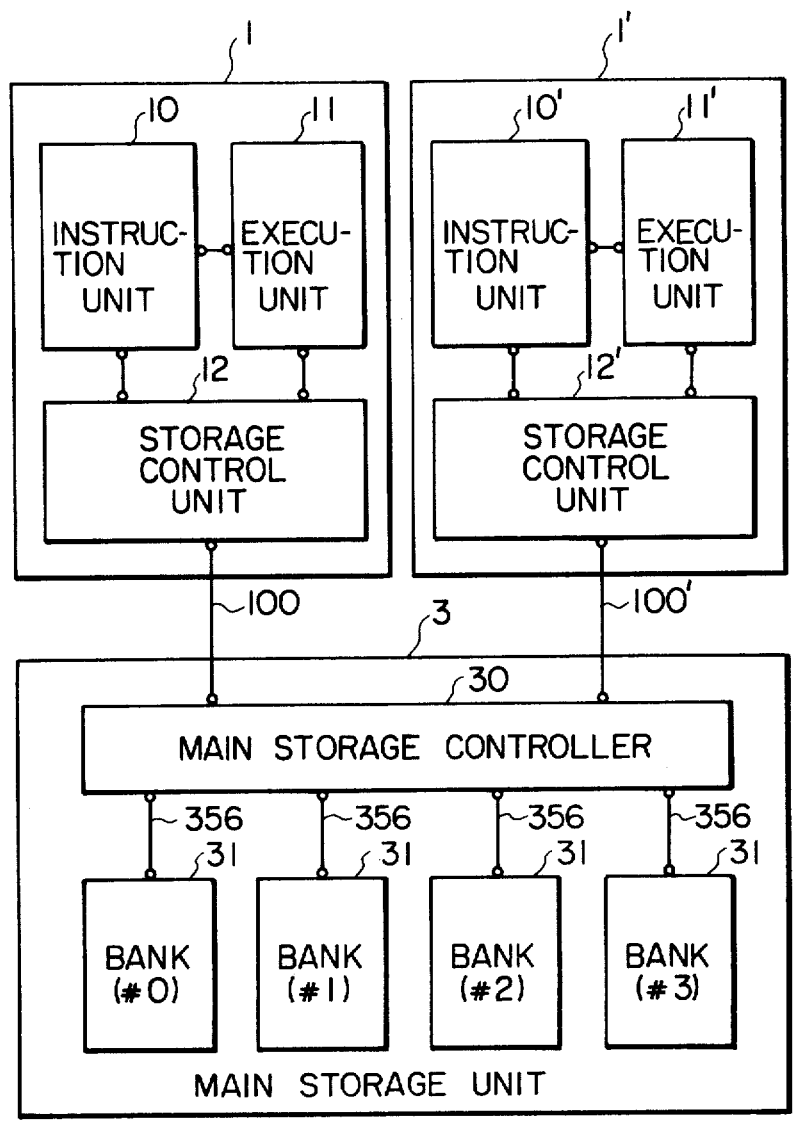
FIG. 1 is a schematic block diagram of a multiprogrammed data processing system of the invention.

FIG. 1 shows a multiprogrammed data processing system according to the invention and comprises intimately coupled central processing units (CPU) 1 and 1'.

In the system of FIG. 1, the CPU 1 consists of an instruction unit 10, an execution unit 11, and a storage control unit 12, while the CPU 1' consists of an instruction unit 10', an execution unit 11', and a storage control unit 12'.

The storage control units 12 and 12' of the respective CPUs issue requests to a main storage unit 3 through lines 100 and 100'. These requests are received by a main storage controller 30. The main storage controller 30 assigns priority levels among the requests from the two CPUs and activates the main storage unit 3 in succession.

In general, the main storage unit 3 is divided into several memory units called "banks" 31 which can operate independently of one another (four banks of memory units 31 are shown in FIG. 1). The main storage controller 30 activates one or more banks according to the request from the CPU.

Figure 2:
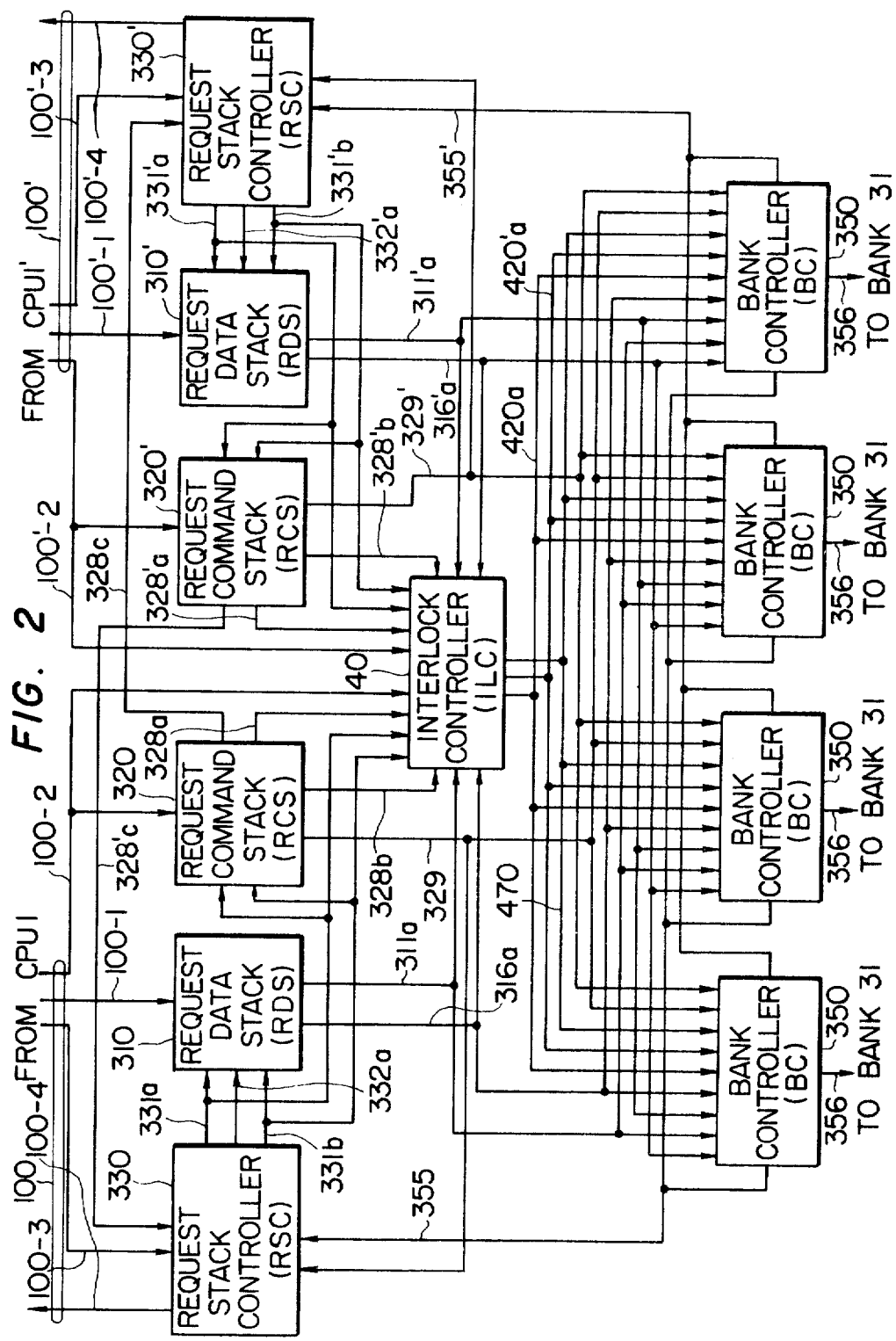
FIG. 2 is a schematic block circuit diagram of a main storage controller of the invention.

FIG. 2 is a schematic block diagram of the main storage controller 30 which is a characterizing portion of the invention.

In the requests from the CPU 1 and CPU 1', data of request addresses, write data and marks for partial write operations are respectively stored in request data stacks 310 and 310' through lines 100-1 and 100'-1. In each of the request data stacks 310 and 310', a plurality of registers are disposed which store therein request addresses, write data, and partial writing marks for a plurality of requests.

Commands (stipulating the kinds of operations in the main storage unit) from the CPUs 1 and 1' and their bank numbers to be operated are respectively stored in request command stacks 320 and 320' through lines 100-2 and 100'-2. The request command stacks 320 and 320' have a plurality of registers for storing a plurality of commands and bank numbers therein.

Figure 3:
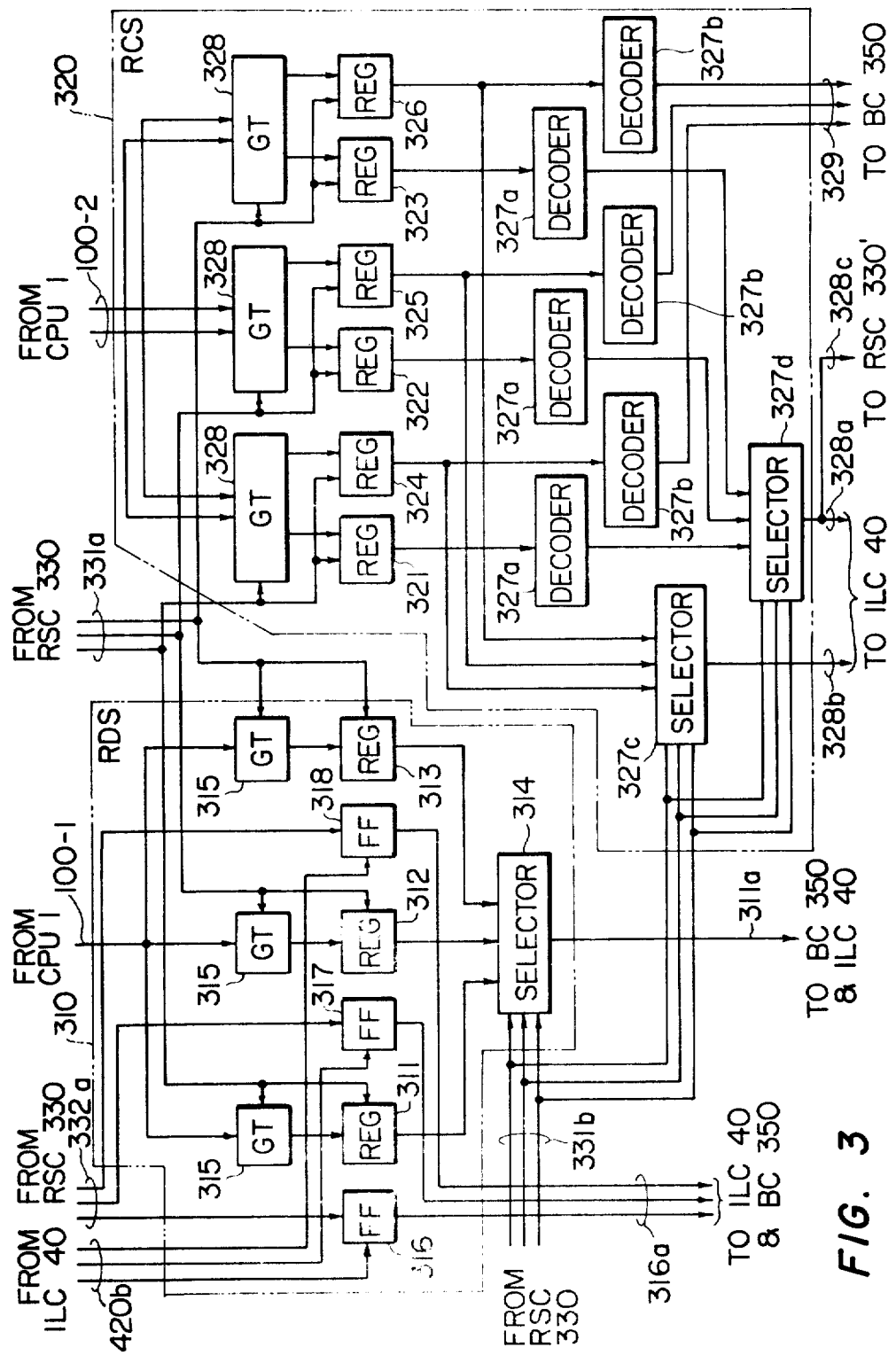
FIG. 3 is a schematic circuit diagram of a request data stack and a request command stack of the invention.

FIG. 3 is a schematic block diagram of the request data stack 310 and the request command stack 320. (The request data stack 310' and the request command stack 320' have the same construction.)

Hereunder, for the sake of explanation, the identification numbers of the registers and lines concerning the CPU 1' shall be the numbers in FIG. 3 with dashes affixed thereto.

The request data stack 310 has three registers 311, 312, and 313. Likewise, the request command stack 320 has six registers 321, 324, 322, 325, 323, and 326. The register 311 of the request data stack 310 corresponds to the registers 321 and 324 of the request command stack 320, the register 312 to the registers 322 and 325, and the register 313 to the registers 323 and 326.

In the registers 311, 312, and 313 within the request data stack 310, the request address, the write data, the partial writing mark, etc., are stored through the line 100-1. The selection of one of the three registers is effected in perfect correspondence with the selection of the register 311, 312, or 313. That is, the selection is done by gates 315 which are enabled or disabled by signals on lines 331a sent from a request stack controller 330. By the signals on the same lines 331a, the data on the line 100-1 is stored in the corresponding registers.

Outputs from the registers are changed over by a selector 314 which is controlled by signals on lines 331b sent from the request stack controller 330.

Where the request addresses have already been stored in the registers 311, 312, and 313, interlock indicators 316, 317, and 318 record "1" respectively when an interlock request within the request command stack 320' for the CPU 1' has been executed.

The registers of the request command stack 320 are of two types. The first type includes the registers 321, 322, and 323, in which commands are stored through the line 100-2. The second type includes the registers 324, 325, and 326, in which bank types are stored. The control of inputs from the line 100-2 to these registers is effected by gates 328. The gates 328 are enabled or disabled by the signals on the lines 331a sent from the request stack controller 330. The signals on the same lines 331a are used as set signals of the respective registers.

The output commands of the registers 321, 322, and 323 are entered into corresponding ones of three decoders 327a which decode whether they are interlock requests or interlock release requests. Each decoder 327a provides different signals depending on whether the output command is an interlock request or an interlock release request. Although the output line of each decoder is illustrated by a single line in the Figure, it is actually composed of two signal lines which become a high level respectively when the interlock request and the interlock release request have been decoded. When the selector 314 within the request data stack 310 selects one of the outputs of the registers 311, 312, and 313 a selector 327d within the request command stack 320 selects the output of one decoder 327a corresponding to the register selected by the selector 314.

The decode signal selected by the selector 327d is transmitted to an interlock controller 40 (FIG. 2) through a line 328a and is used for setting or resetting registers for interlock bank numbers or addresses in the interlock banks. Also, the output of the selector 327d is sent to a request stack controller 330' (FIG. 2) through a line 328c and is used for setting interlock indicators 316', 317', and 318' within the request data stack 310'. On the other hand, bank number outputs from the registers 324, 325, and 326 are decoded by decoders 327b which are disposed in a manner to correspond to the respective registers. They are sent to bank controllers 350 (FIG. 2) through lines 329 and their priority levels compete with those of other requests every bank. Further, the signals on the lines 329 are sent to the request stack controller 330 and are used for determining requests to be sent from the request data stack 310 and the request command stack 320.

The output of each decoder 327b is delivered onto four signal lines. Each of the three lines illustrated as the lines 329 consists of four lines in correspondence with the four banks. The output of each decoder appears on only one of the four lines.

A selector 327c serves to select the bank numbers stored in the registers 324, 325, and 326 and to send them to the interlock controller 40 (FIG. 2) through a line 328b. The select signals of this selector are sent from the request stack controller 330 through lines 331b. The bank number selected onto the line 328b is stored in the interlock controller 40 as the interlock bank number.

As described thus far, the request data stack 310 and the request command stack 320 fundamentally function to store up to three new requests from the CPU 1 and also to decode whether the request is the interlock request or whether or not it is the interlock release request and to thereafter transmit to the bank controller 350 one request assigned by the signal from the request stack controller 330.

This applies to the request data stack 310' and the request command stack 320' quite similarly. Although, in the present embodiment, the number of the register groups in the request data stack 310 (310') or the request command stack 320 (320') is made three by way of example, it is not limited to three.

Referring to FIG. 2 again, the interlock controller 40 fundamentally conducts the following five operations:

(1) Where a request stored in the request data stack 310 as well as the request command stack 320 or the request data stack 310' as well as the request command stack 320' has had a preference given in the bank controller 350 and when the request is an interlock request, the address of the request or the interlock address (which consists of interlock bank number and an address within the interlock bank) is stored into the predetermined register;

(2) when a new request is entered from the CPU 1 or CPU 1' into the main storage controller 30 and is stored into the request data stack 310 as well as the request command stack 320 or the request data stack 310' as well as the request command stack 320', the address information (bank number and an address within the bank) of the new request is compared with the interlock address previously stored in operation (1) in parallel with the storing operation in this operation (2);

(3) when an interlock request has been executed, an unexecuted request is already stored in the request data stack 310 as well as the request command stack 320, or the request data stack 310' as well as the request command stack 320' and when the unexecuted request has had a preference given the address information of the request is compared with the interlock address information already stored;

(4) delivering the results of the comparisons in operations (2) and (3) to the bank controller 350;

(5) where a request stored in the request data stack 310 as well as the request command stack 320 or the request data stack 310' as well as the request command stack 320' has had a preference given in the bank controller 350 and when the request is an interlock release request, interlock address information already stored is reset.

Figure 4A:
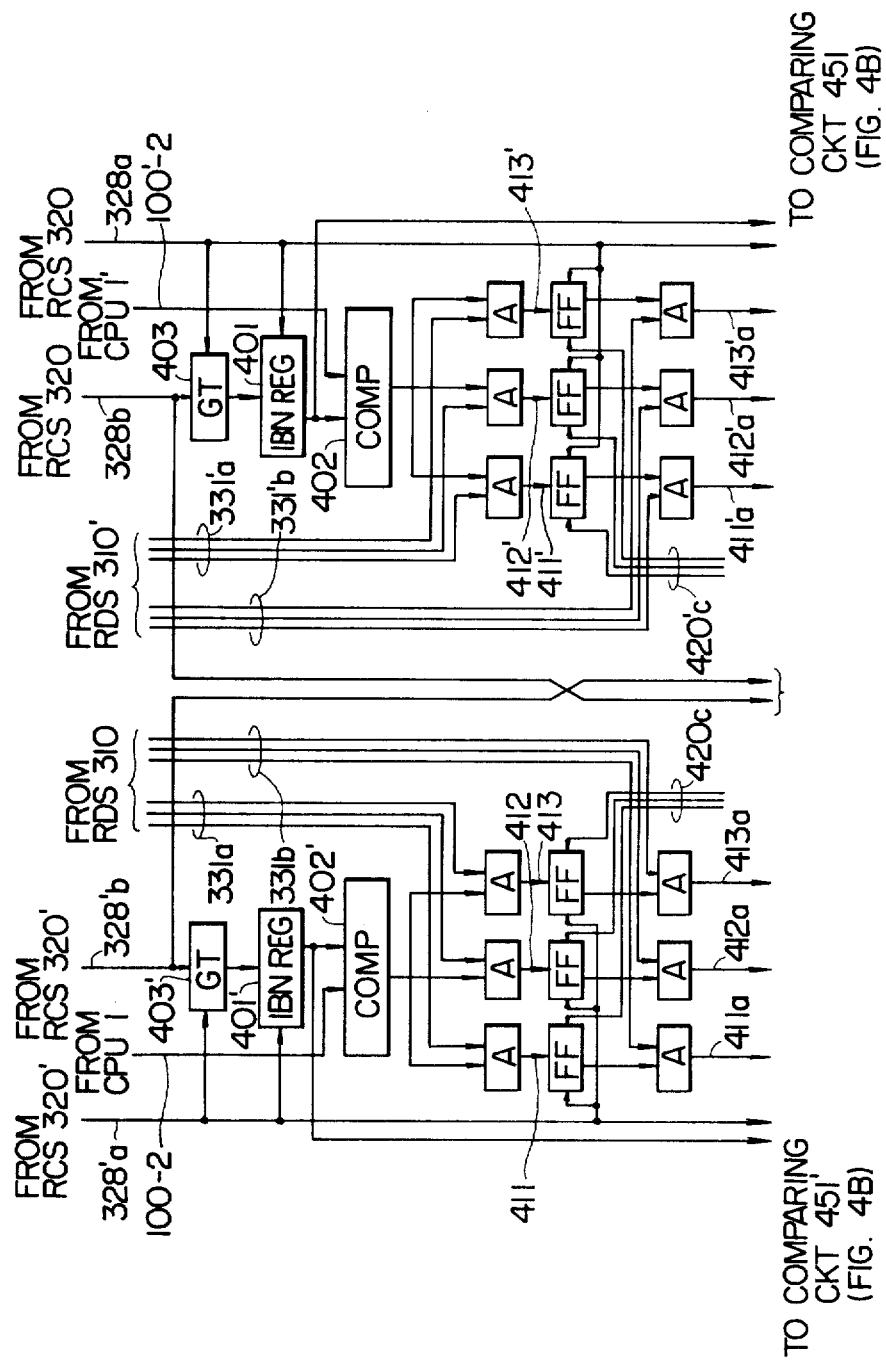
FIGS. 4A and 4B are detailed block diagrams of an interlock control circuit of the invention.
Figure 4B:
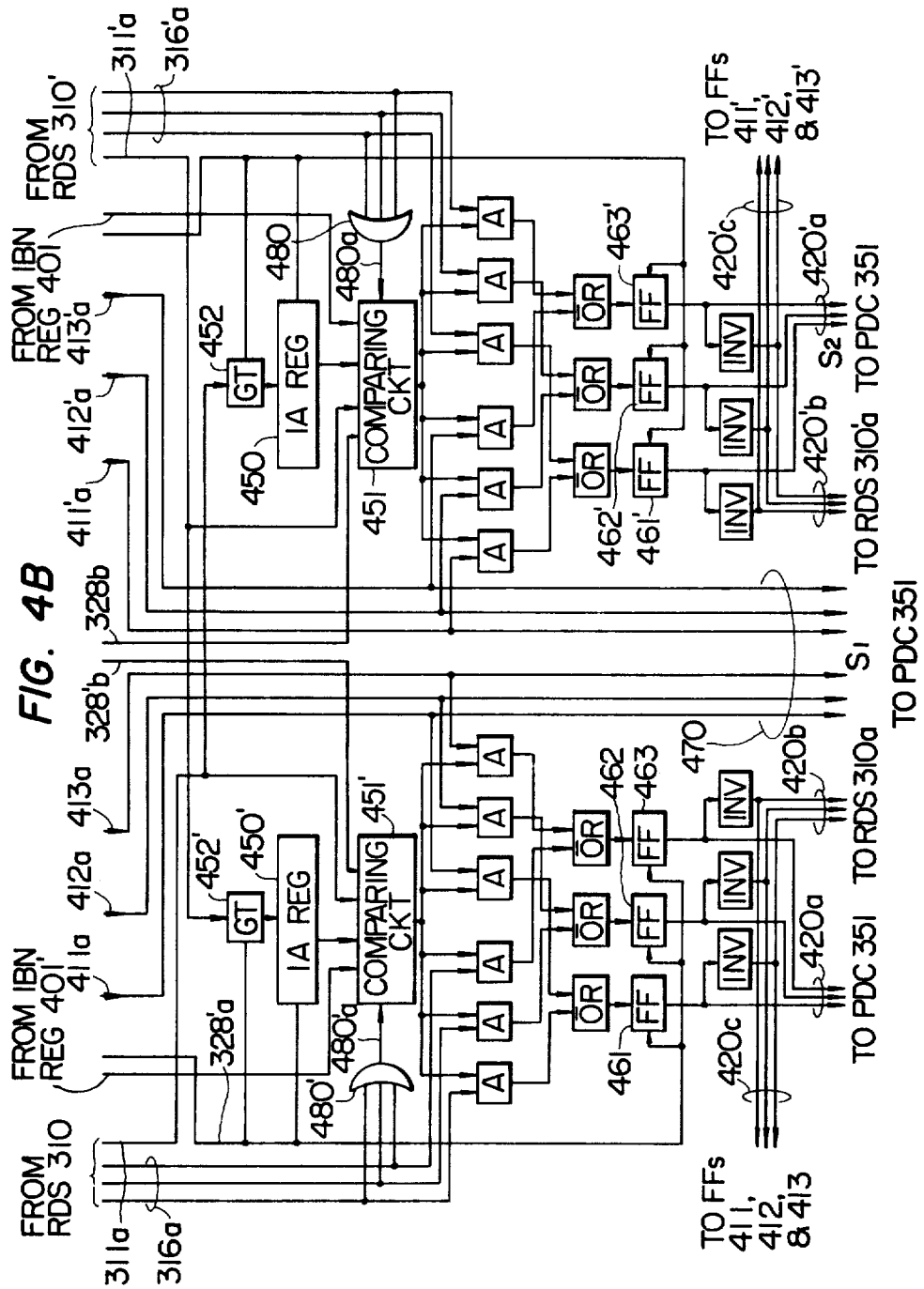

The interlock controller 40 is constructed of circuits shown by schematic block circuit diagrams in FIGS. 4A and 4B.

An interlock bank number register 401 stores therein the bank number of the interlock request from the CPU 1 being executed. Likewise, an interlock address register 450 stores therein an interlock address-within-a-bank of the interlock request from the CPU 1 being executed. The bank number to be stored in the interlock bank number register 401 is given from the request command stack 320 and through the line 328b. The bank number is set into the interlock bank number register 401 in such a way that a gate 403 is enabled by an interlock request decode signal sent through the line 328a from the request command signal 320, whereupon the decode signal is used as a set signal.

Likewise, the intra-bank address to be stored in the interlock address register 450 is supplied from the request data stack 310 and through the line 311a. The interlock address register 450 stores the intra-bank address therein in such a way that a gate 452 is enabled by the interlock request decode signal sent through the line 328a from the request command stack 320 whereupon the interlock request decode signal is used as a set signal.

A comparator 402 serves to compare the interlock bank number stored in the interlock bank number register 401 and bank number of a request sent anew from the CPU 1' to the main storage unit 30. At the same time that the new request from the CPU 1' is sent to the request data stack 310' as well as the request command stack 320', the bank number of the request is entered into the interlock controller 40 through a line 100'-2. This bank number is compared with the interlock bank number in the interlock bank number register 401 by the comparator 402. This comparator provides a signal "1" when they coincide. First comparison indicators 411', 412', and 413' are made up of flip-flops for storing the output of the comparator 402. The three first comparison indicators are disposed in correspondence with the number of requests, three, which can be stored in the request data stack 310' as well as the request command stack 320'. AND gates which connect the comparator 402 with the first comparison indicators 411', 412', and 413' serve to enter the comparator output into one of the first comparison indicators 411', 412', and 413'.

These AND gates are selectively enabled by signals on the lines 331a. The signals on the lines 331a are also signals for selecting the request from the CPU 1' into the predetermined registers in the request data stack 310' as well as the request command stack 320'. After all, the first comparison indicators 411', 412', and 413' store the output of the comparator 402 therein when the new request from the CPU 1' is stored in the register groups 311', 321', 324', 312', 322', 325', and 313', 323', and 326' with the request data stack 310' and the request command stack 320'.

As reset signals for the first comparison indicators 411', 412', and 413' there is used the interlock release request decode signal which is sent through the line 328a. The outputs of the first comparison indicators are sent to priority level determining circuits within the bank controllers 350 (FIG. 2) through lines 411'a, 412'a, and 413'a (which are collectively indicated as lines 470).

A comparator circuit 451 has the first function of comparing the intra-bank interlock address stored in the interlock address register 450 and the intra-bank address transmitted through the line 311'a from the request data stack 310'.

Further, the comparator 451 has the second function of comparing the outputs of the interlock bank number register 401 and the interlock address register 450 respectively with the bank number transmitted through the line 328'b from the request command stack 320 and the intra-bank address transmitted through the line 311'a from the request data stack 310'.

The outputs of interlock indicators 316', 317', and 318' (FIG. 3) within the request data stack 310' are entered into an OR gate 480 through lines 316'a. The output of the OR gate 480 is entered into the comparator 451 through a line 480a.

Depending on whether or not a signal of a high level has been entered from the line 480a, the comparator 451 switches and performs the second and first functions.

Figure 5:
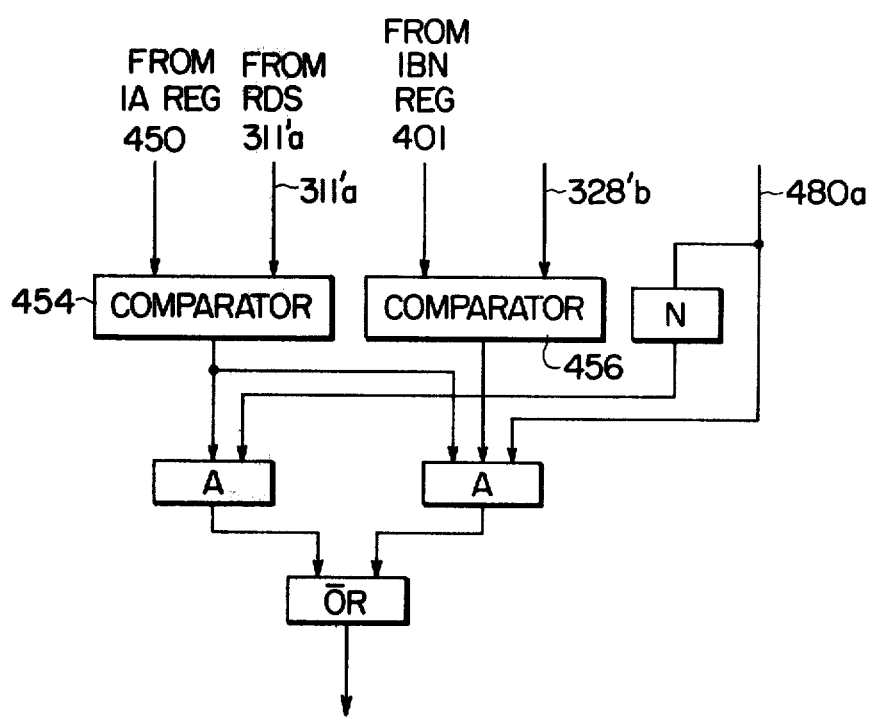
FIG. 5 is a schematic circuit diagram of a comparator circuit 451 employed in the interlock control circuit shown in FIG. 4B.

The comparator 451 has a circuit arrangement which is shown in FIG. 5. Referring to the Figure, a comparator 454 compares the output of the interlock address register 450 and the signal on the line 311'a. A comparator 456 compares the output of the interlock bank number register 401 and the signal on the line 328'b. When the signal on the line 480a is at a low level, the comparator 451 provides only the comparison result of the comparator 454. When the signal on the line 480a is at a high level, the comparator 451 provides the signal of the high level only where both the comparison results of the comparators 454 and 456 indicate the coincidences.

The output of the comparator 451 is set in any of second comparison indicators 461', 462', and 463' through AND gates and OR gates. The second comparison indicators are made up of three flip-flops which are disposed in correspondence with the three sets of registers within the request data stack 310'. In which second comparison indicator the output of the comparator 451 is stored is determined by controlling the "on" and "off" conditions of the AND gates with the signals on the lines 411'a, 412'a, and 413'a, or the signals on the lines 316'a.

The outputs of the second comparison indicators 461' through 463' are directly sent to the priority level determining circuit within the bank controller 350 (FIG. 2) through lines 420'a. Inverted signals of these outputs are sent through lines 420'c to the first comparison indicators 411' through 413' to reset them, and they are also sent through lines 420'b to the interlock indicators 316' through 318' within the request data stack 310' in order to reset them.

The above explanation has been made of the operations of the circuit portions within the interlock controller 40 concerning the case where the request is provided from the CPU 1' while the interlock request from the CPU 1 is being executed.

Circuit portions within the interlock controller 40' concerning a case where, to the contrary, a request is provided from the CPU 1, while an interlock request from the CPU 1' is being executed, operate quite similarly to the foregoing circuit portions. Therefore, an explanation will be omitted.

Figure 6:
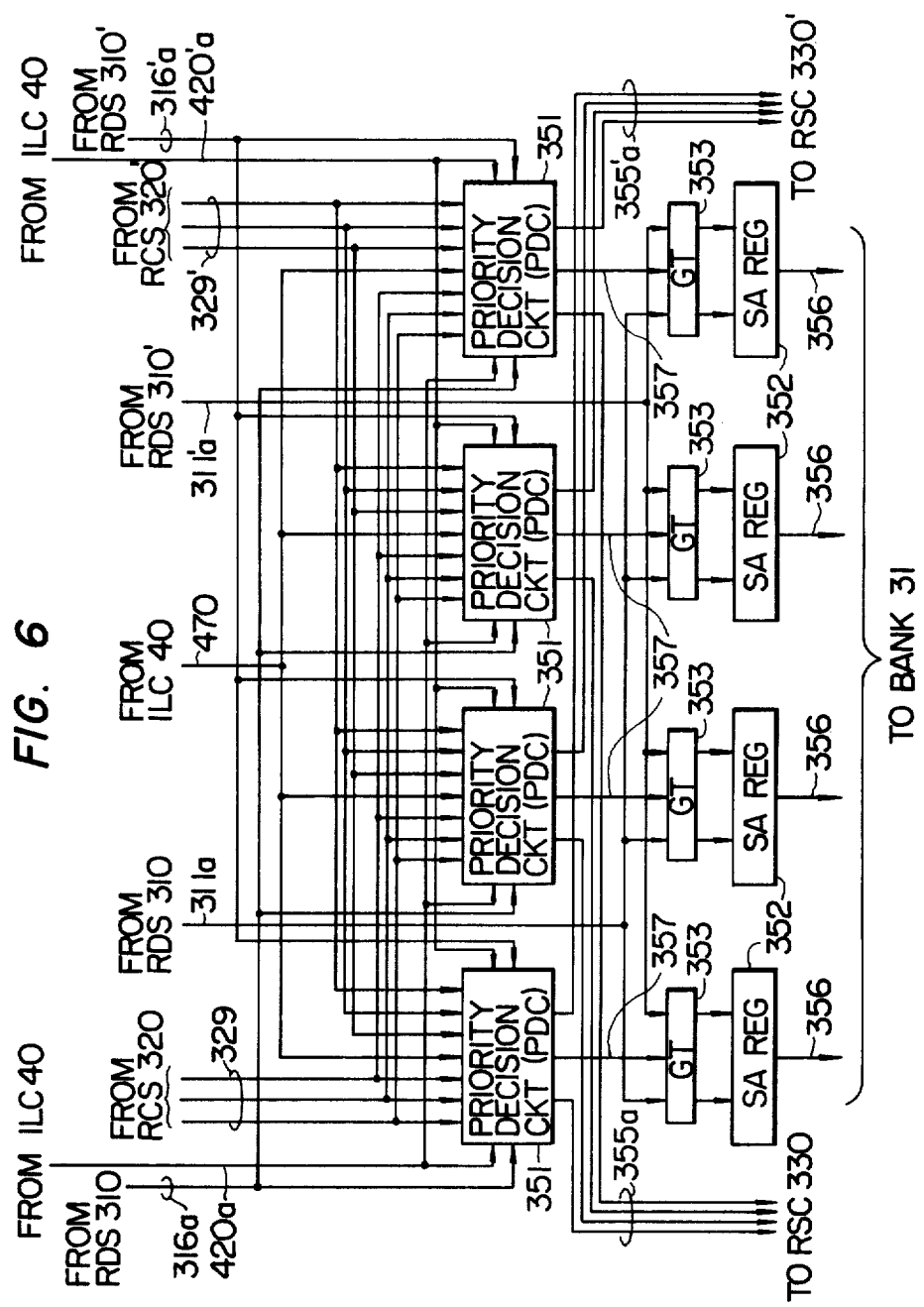
FIG. 6 is a block circuit diagram of a bank control circuit of the invention.

FIG. 6 is a block diagram showing the construction of the bank controllers 350 (FIG. 2). The bank controllers 350 are formed of four equivalent portions and each corresponds to one bank 31. This portion consists of the priority determining or deciding circuit 351, a storage address register 352, and a gate 353 connecting them. The priority decision circuits 351 receive bank numbers entered through the respective lines 329 and 329' from the request command stacks 320 and 320', and decode whether or not the entered bank numbers are the numbers of the banks associated with the particular priority decision circuits. Further, they transmit the outputs of the first and second comparison indicators sent through the lines 470 and 420'a from the interlock controller 40 and control signals of the gate 353 and signals to the request stack controller 330 according to the previous decode results.

The intra-bank addresses are entered into the gates 353 through the respective lines 311a and 311'a from the request data stacks 310 and 310' and they are set into the storage address registers 352 when the gates are enabled. Data of address values indicated by the contents of the storage address registers are read out from the respective banks.

Figure 7:
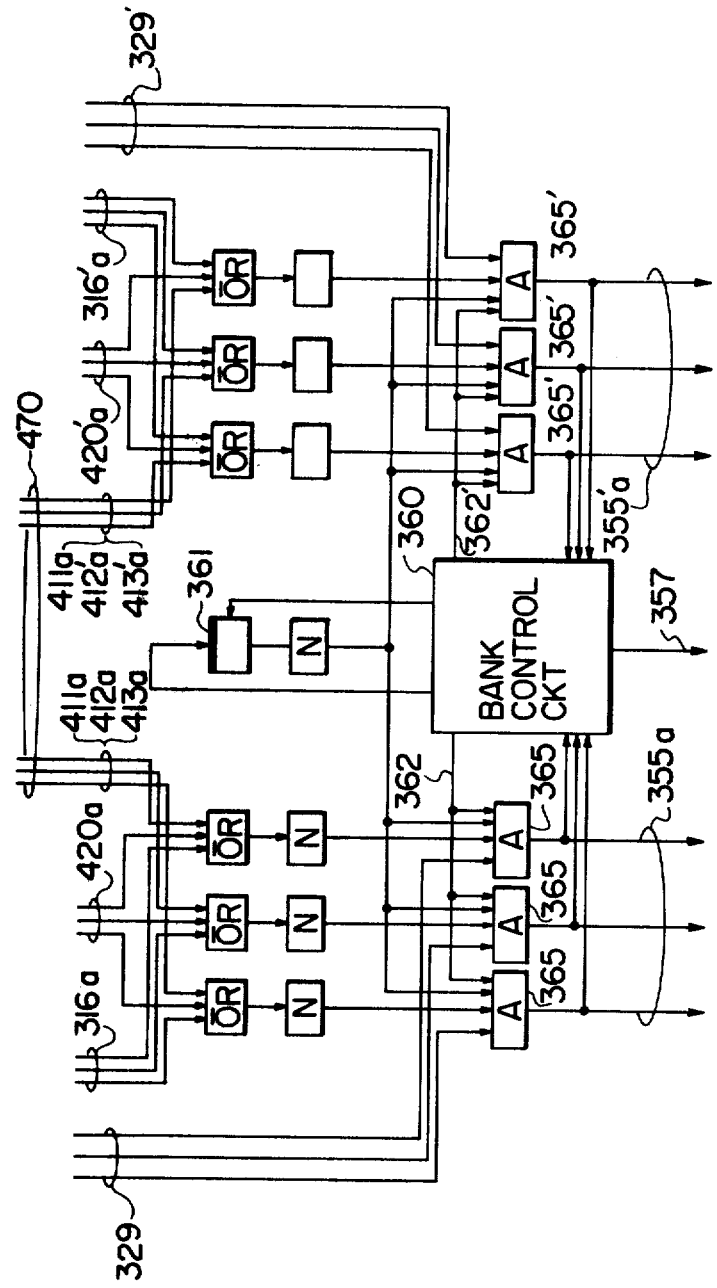
FIG. 7 is a schematic block diagram of a priority level determining circuit according to the invention.

FIG. 7 is a schematic block diagram of one priority decision circuit 351. Signals entered through lines 316a, 420a, 411a, 412a, and 413a are OR'd in correspondence with the respective registers 311, 312, and 313 within the request data stack 310 and their inverted signals are entered into respective AND circuits 365. All the signals are signals which signify an inhibition of the priority decision of the requests. Signals entered through the lines 329 from the request command stack 320 are entered into the AND circuits 365 in correspondence with the registers 311, 312, and 313 within the request data stack 310. The AND circuits 365 also receive an inverted signal of an output of a flip-flop 361 and a signal from a bank control circuit 360.

The flip-flop 361 indicates whether or not the particular bank 31 is in the busy state. Its output "1" indicates the busy state and the AND circuits 365 are disabled. The flip-flop is set to "1" by a signal from the bank control circuit 360 when the priority level in the particular bank 31 has been decided and it is reset from the bank control circuit 360 after a fixed cycle.

The bank control circuit 360 provides signals 362 and 362' which control the requests from the CPU 1 and CPU 1' to the particular bank 31 so that they have priorities alternately. The lines 362 and 362' are controlled so that either may always become the high level.

The AND circuits 365 are disposed in correspondence with the registers 311, 312, and 313 within the request data stack. Their outputs indicate whether or not the registers 311, 312, and 313 within the request data stack can attribute the priority of the request to the particular bank and are sent to the request stack controller 330 through lines 355a. Which of the three requests within the request data stack is finally selected is determined by the request stack controller 330. The same function is executed as to the requests from the CPU 1'.

In FIG. 2, the request stack controllers 330 and 330' are circuits for determining registers to store the requests within the request data stacks 310 and 310' and the request command stacks 320 and 320' and registers to deliver the requests to the bank controller 350. The request stack controllers 330 and 330' are circuits of the same construction. Hereinbelow, only the request stack controller 330 will be explained.

Figure 8:
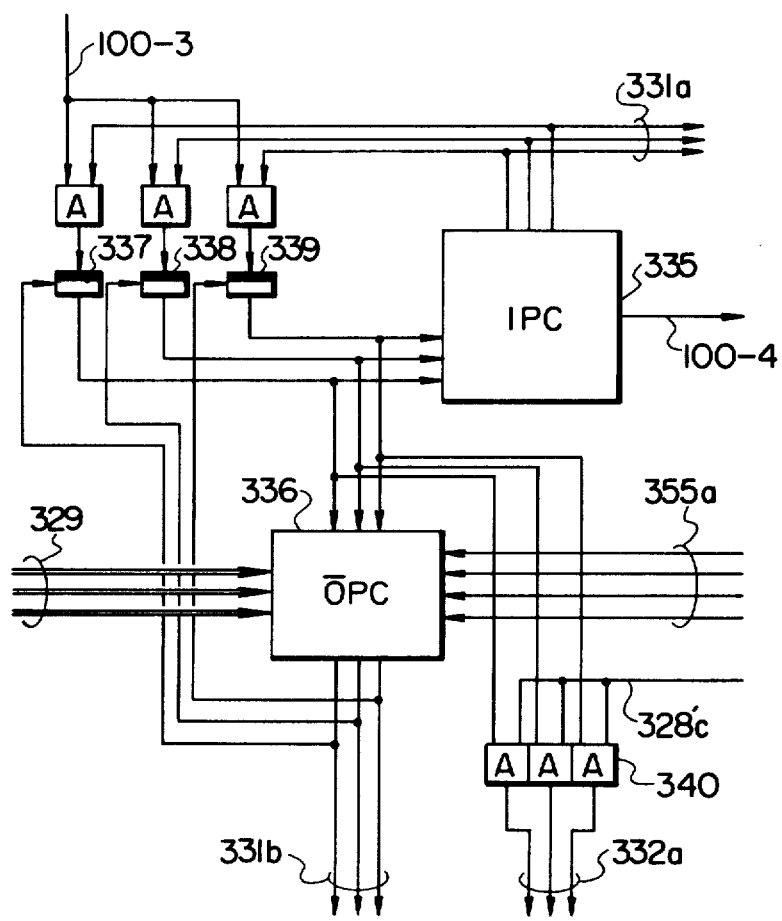
FIG. 8 is a schematic circuit diagram of a request stack control according to the invention.

FIG. 8 is a schematic block diagram of the request stack controller 330. The request stack controller 330 includes flip-flops 337, 338, and 339 indicating whether or not the requests are stored in the respective registers in correspondence with the registers 311, 312, and 313 within the request data stack 310. When a signal indicative of a request transfer is entered from the storage control unit 12 through a line 100-3 into the request stack controller 330, the AND function between a signal from an in-pointer control 335 and the signal on the line 100-3 is effected to set any one of the flip-flops 337, 338, and 339 to "1". The in-pointer control 335 detects the states of the registers in the request data stack 310 with output signals of the flip-flops 337, 338, and 339 and determines which register the request from the storage control unit 12 is to be set in. Three outputs 331a of the in-pointer control 335 are sent to the request data stack 310, the request command stack 320, and the interlock controller 40. If the requests are stored in all the registers within the request data stack 310, a signal which inhibits a request transfer to the storage control unit 12 is sent to the CPU 1 through a line 100-4. The outputs of the flip-flops 337, 338, and 339 are entered into an outpointer control 336 and are simultaneously entered into AND circuits 340 in order to be ANDed with a signal sent through a line 328'c from the request command stack 320'.

The out-pointer control 336 receives, besides the outputs of the flip-flops, the three sets of the decode outputs of the bank addresses sent through the lines 329 and the results of the priority decision from the priority decision circuits 351 sent through the lines 355a to determine which of the requests within the three registers of the request data stack 310 is sent to the bank. It sends a signal indicative of the result of the determination to the request data stack 310, the request command stack 320, and the interlock controller 40 through lines 331b. The signals on the lines 331b are sent to the flip-flops 337, 338, and 339 to reset the corresponding flip-flops.

The outputs of the AND circuits 340 are sent to the request data stack 310 through lines 332a and set the interlock indicators 316, 317, and 318.

FIGS. 9A through 9D are diagrams for explaining the operations of the system constructed as stated above. Hereunder, the operations of the system according to the invention will be described with reference to FIGS. 2 through 9A-9D.

Prior to the transmission of requests or address data from the CPUs 1 and 1' to the request data stacks 310 and 310' or the request command stacks 320 and 320', a signal indicative of a request transfer is entered from the CPU 1 or 1' to the request stack controller 330 or 330' through the line 100-3 or 100'-3. The request stack controllers 330, 330' operate the in-pointer control 335 with the outputs of the flip-flops 337, 338, 339, and 337', 338', and 339' that store which of the respectively three sets of registers within the request data stacks 310, 310' is in the idle state. If no set of registers is idle, a busy signal is sent back to the CPU through the line 100-4 and the transfer of the request to the CPU is inhibited.

The request stack controllers 330, 330' do not transmit the busy signal when any set of registers are idle. Instead they enable the gates 315, 328 or 315', 328' within the request data stack 310 and the request command stack 320 or the request data stack 310' and the request command stack 320' through the lines 331a, 331'a to store in the idle registers the address data, the command, etc., sent from the CPU. The request data stack and the request command stack can store up to three sets of requests. The request stack controller 330 or 330' provides onto the lines 331b or 331'b signals for controlling the selectors 314, 327c, 327d, or 314', 327'c, 327'd in order to deliver the requests at predetermined times from one loaded first.

(i) Neither of the delivered requests from the CPUs 1 and 1' is the interlock request.

At this time, no signal is provided from the decoder 327a or 327'a within the request command stack 320 or 320'. Accordingly, no signal is provided from the interlock controller 40 to the priority decision circuit 351.

From the decoder 327b, 327'b within the request command stack 320, 320', the signal with the bank number in the registers 324 through 326 or 324' through 326' decoded is sent to the bank controller 350 through the line 329. The signal is sent to the priority decision circuit 351. Assuming that, at this time, no signal is delivered onto the lines 470, 420a from the interlock controller 40, also, no signal being delivered onto the lines 316a, 316'a from the request data stacks 310, 310', the priority decision circuit 351 decides according to predetermined rules the priority levels among the decode signals of the bank numbers entered through the lines 329, 329'. Each priority decision circuit 351 gives a preference to only one request if each bank 31 is usable. The result of the decision of the preference is sent to the request stack controller 330 or 330' through the line 355a or 355'a.

The request stack controller 330 or 330' has the possibility of receiving signals signifying that three requests at the maximum have had preferences given by the priority decision circuit 351. In this case, only one of them is selected by a predetermined order control system (for example, a first-in first-out system). In the case where only one request has had the preference by one of the priority decision circuits 351, the request stack controller 330 or 330' selects the request with the preference given.

The request stack controllers 330, 330' deliver signals for providing the selected request from the request data stack 310, the request command stack 320, or the request data stack 310', the request command stack 320' onto the lines 331b or 331'b.

By way of example, where the request stored in the register 311 within the request data stack 310 and the registers 321, 324 within the request command stack 320 has been selected the contents of the register 311 are selected by the selector 314 and entered into the priority decision circuit 351 through the lines 311a. The priority decision circuit 351 having given the preference to the request corresponding to the register 311 transmits onto the line 357 the signal REQ which controls the gate 353 to pass the signal on the line 311a. Accordingly, the contents (request address, write data, partial writing mark, etc.) of the register 311 are set in the storage address register 352.

In this manner, when the interlock request is not delivered, the interlock controller 40 does not intervene and processing of the request is not delayed due to the presence of the interlock controller 40.

(ii) The delivered request from the CPU 1 is the interlock request.

The interlock is processed in the order of reading out lock information from memory 3, transferring the read lock information to the execution unit 11, checking the lock information in the execution unit 11, updating the lock information in the execution unit 11, and loading the updated lock information into the memory 3.

The respective banks within the main storage unit 3 are accessed in units of eight bytes. The lock information is one byte among them. The interlock is applied every eight bytes. An instruction which executes the interlock is the TS instruction. The request command to the main storage controller 30 started by the instruction (hereinbelow termed interlock command) indicates the two types of operations of "read request" and "interlock request".

The request command concerning the interlock command, the command itself, and the bank number are respectively loaded into the registers within the request data stack 310 and the request command stack 320 under the control of the request stack controller 330 similarly to usual requests. Let it be assumed that the aforecited data is respectively loaded into the registers 311, 321, and 324.

The decode result of the bank number of the register 324 is transmitted to the priority decision circuit 351 through the line 329 and has the priority level decided therein. Where the priority decision circuit 351 has determined the priority levels according to the predetermined ordinary rules and as a result the interlock command has been given the preference and the content of the register 311 is entered into the storage address register 352 in the same way as in (i). At this time, the intra-bank address within the register 311 is simultaneously sent to the gate 452 within the interlock controller 40 through the selector 314 and the line 311a. At this time, the output of the decoder 327a within the request command stack 320 is simultaneously selected by the selector 327d and entered into the gate 452 through the line 328a. The gate 452 is enabled when the decode signal of the "interlock request" has been entered from the line 328a. In this case, the command of the register 321 is accompanied with the interlock request so that the gate 452 is enabled and the address within the register 311 is stored in the interlock address register 450.

In parallel with these operations, the bank number within the register 324 is selected by the selector 327c and is entered into the gate 403 within the interlock controller 40 through the line 328b. This date 403 is enabled by the decode signal of the "interlock request" on the same line 328a as in the foregoing gate 452. Accordingly, the bank number within the register 324 is stored in the interlock bank number register 401.

The interlock address register 450 and the interlock bank number register 401 have a valid bit indication of further one bit therein and are set to "1" while the interlock is applied to the main storage. Concretely, when the request accompanying the "interlock request" has been given the preference in the priority decision circuit 351 and the intra-bank address and bank number of the request have been stored in the interlock address register 450 and the interlock bank number register 401, the valid bit indication representative of the validity of the interlock address register 450 and the interlock bank number register 401 is set to "1"

The valid bit indication is reset in such a way that the request accompanying the "interlock release request" has the preference given in the priority decision circuit 351 to deliver the "interlock release request decode signal" to the line 328a.

When the main storage is interlocked by the request from the CPU 1 and the address and bank number are respectively set in the interlock address register 450 and the interlock bank number register 401, a flag is simultaneously applied to that one of the registers 311', 312', and 313' of the request data stack 310' corresponding to the CPU 1' in which the request from the CPU 1' is stored. The interlock indicators 316', 317', and 318' in FIG. 3 are the flags. The interlock indicators 316' through 318' are set by the lines 328c which are branched from the lines 328a transmitting the "interlock requests". The lines 328c are sent from the request command stack 320 to the request stack controller 330'. The request stack controller 330' transmits a signal for setting the interlock indicator to this interlock indicator through the line 332'a, the interlock indicator corresponding to that one of the registers 311', 312', and 313' in which the address for the request from the CPU 1' is already stored.

(ia) Processing of a request already stored in the request data stack 310' when the interlock is applied from the CPU 1 to the main storage.

Now, consider a case where the request from the CPU 1' is already stored in the register 311'.

At this time, a "1" is set in the interlock indicator 316' by the operation previously stated.

When, after competition of the priority levels in the priority decision circuit 351 as ordinary requests, the request with the flag set is selected, the intra-bank address of the register 331' is sent to the comparator 451 of the interlock controller 40 through the line 311'a. At this time, a "1" is entered into the OR gate 480 through the line 316'a from the flag 316' within the request data stack 310', so that a high level is provided to the line 480a. Accordingly, the comparator 451 effects the second function as stated previously.

The comparator 451 receives the interlock intra-bank address stored in the interlock address register 450, the interlock bank number stored in the interlock bank number register 401, and the bank number entered through the selector 327'c and the line 328'b from the request command stack 320'. It tests the coincidence between the request address from the CPU 1' and the address interlocked at this time (block "C₂" in FIG. 9A). The priority decision circuit 351 holds the gate 353 disabled while it receives the output of the interlock indicator 316' through the line 316'a. The compared result has its logical product taken with the output result 316'a of the flag 316' and the logical product is set through the logical sum circuit OR into the second comparison indicator 461' corresponding to the register 311'.

Where coincidence has occurred as the result of the comparison, the output ("1") $S_2$ of the second comparison indicator 461' is sent to the priority decision circuit 351 through the line 420'a. Upon receiving the second comparison indicator output, the priority decision circuit inhibits the address, write data, partial writing mark, etc., of the register 311' from being set into the storage address register 352. This inhibition is effected by prohibiting the set signal (REQ) from the priority decision circuit 351 to the storage address register 352 from being delivered to the line 357.

Figure 9A:
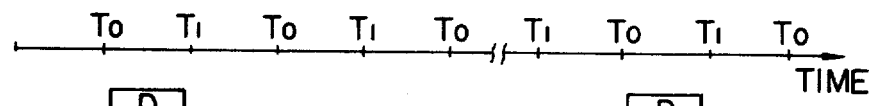
FIGS. 9A through 9D are flow diagrams of processings according to the invention in the main storage controller.

The timing relations among them are as shown in FIG. 9A. In a cycle T immediately after the priority levels have been decided, the output of the interlock indicator 316' is entered through the lines 316'a, whereby the set of the address, write data, partial writing mark, etc., into the storage address register 352 is inhibited by prohibiting the set signal 357. In the next cycle $T_0$, the set into the storage address register 352 is again inhibited by the signal $S_2$ on the output line 470 of the second comparison indicator 461'.

Until the interlock from the CPU 1 is thereafter released, the request is held in the register 311' of the request data stack 310'. After the interlock release, the priority levels are taken again in the priority decision circuit 351. Concretely, the decision of the priority is asked of the priority decision circuit 351 every cycle and each time the bestowal of the priority on the request is inhibited by the output signal 420'a of the second comparison indicator 461'. Accordingly, the output 420'a of the second comparison indicator has the function of prohibiting the set signal (REQ) to the storage address register 352 from being delivered to the line 357 in the priority decision circuit 351 (when the priority level of the request has been decided) and the function of prohibiting the award of priority on the request until the interlock is thereafter released.

On the other hand, where the comparison has not resulted in coincidence, a "0" is set in the second comparison indicator 461'. At this time, the output ("0") of the second comparison indicator 461' is sent to the priority decision circuit 351 but the set signal $S_2$ to the storage address register 352 is delivered to the line 357 and the request data of the register 311' is set into the storage address register 352. Simultaneously, the negation of the output of the second comparison indicator 461' is sent to the request data stack 310' through the line 420'b to reset the interlock indicator 316' of the register 311' of the request data stack 310'.

(ib) Processing of a request transmitted from the CPU 1' to the main storage control 30 after an interlock from the CPU 1 has been applied.

The address, write data, etc., are stored from the storage control unit 12' through the line 100'-1 to the register of the request data stack 310' likewise to the ordinary requests (they are now assumed to be stored in the register 311'). The command and the bank number are respectively stored in the registers 321' and 324' of the request command stack 320'.

At this time, the bank number is stored in the register 324' and simultaneously entered directly from the storage control unit 12' into the interlock controller 40 by the line 100'-2 so as to be compared with the value of the interlock bank number register 401 by the comparator 402. (This processing is executed whenever the main storage controller 30 receives the request from the CPU 1 or 2, irrespective of the presence or absence of the interlock. However, when the interlock is not under application, the interlock bank number register 401 or 401' has the valid bit "0" therein so that the result of the comparison is ignored.)

The result of the comparison is indicated on the first comparison indicator through the logical product circuit. There are the three first comparison indicators (411', 412', 413') corresponding to the three registers of the request data stack 310' and the result is indicated by the line 331'a from the request stack controller 330'. The line 331'a indicates in which of the registers of the request data stack 310' the request from the CPU 1' is to be stored and in correspondence therewith, the output result of the comparator 402 is instructed to be displayed on the first comparison indicator 411', in this case. Thus, in parallel with the load of the request into the request data stack 310', it can be tested if the request from the CPU 1' is one for the interlocked bank.

When coincidence has been found as the result of the comparison by the comparator 402, a "1" is indicated on the first comparison indicator 411' to that effect. The request from the CPu 1' at which "1" is indicated on the first comparison indicators 411' through 413' is a request to a bank which includes the lock information B interlocked by the CPU 1.

In parallel with the processing in the interlock controller 40, an ordinary priority decision is carried out. When the priority level of the request from the CPU 1' (stored in the register 311') has been decided by the priority decision circuit 351, it is supplied to the request stack controller 330' by the line 355'. The request stack controller 330' reports to the request data stack 310' and the request command stack 320' through the line 331'b that the request data of the register 311' is to be transmitted to the main storage bank. Simultaneously, it transmits the same signal to the interlock controller 40.

Figure 9B:
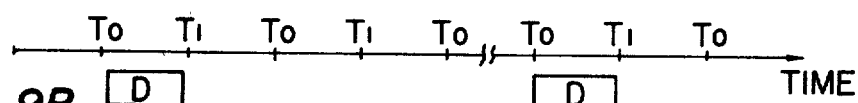
Figure 9C:
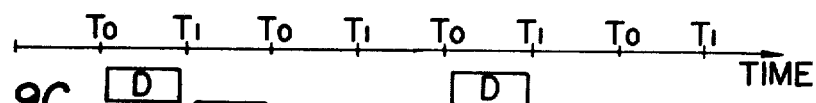

The request data stack 310' transmits the data of the register 311' to the gate 353 through the selector 314' and the line 311'a by the signal of the line 331'b. Simultaneously, the interlock controller 40 takes the logical product between the output $S_1$ of the first comparison indicator 411' and the signal of the line 331'b and sends the resultant output to the priority decision circuit 351 by the line 470. The output $S_1$ of the first comparison indicator 411' indicates that the particular request is a request to a bank which includes the lock information interlocked by the CPU 1. Accordingly, in order to inhibit storage of the request data of the register 311' into the storage address register 352, the priority decision circuit 351 prohibits the set signal to the storage address register 352 (REQ) from being delivered onto the line 357 (FIGS. 9B and 9C).

At this time, the address included in the register 311' is entered into the interlock controller 40 through the line 311'a and is compared with the value of the interlock address register 450 by the comparator 451. The output of the comparator 451 has its logical product taken with the signal having passed through the logical product circuit of the first comparison indicator 411' and then indicated on the second comparison indicator 461'. (When coincidence has been found as the result of the comparison a "1" is indicated.) Likewise, to the first comparison indicators, there are three second comparison indicators which correspond to the three registers of the request data stack 310' at 1-to-1. (In this case, the indicator 461' corresponds to the register 311'.)

A "1" is set in the second comparison indicator where the corresponding request from the CPU 1' (stored in the register 311') is a request for reference to the eight-byte region including the lock information A.

When a "1" is indicated on the second comparison indicator, as previously stated, the set signal REQ is prohibited from being transmitted to the line 357 in order to inhibit the request of the register 311' from being set in the storage address register 352.

In such a case, storage in the storage address register 352 is once inhibited by the output 470 of the first comparison indicator 411'. When the comparison further coincides in the comparator 451, storage into the storage address register 352 is inhibited until the release of the interlock. In this manner, storage is prohibited in two stages (refer to FIG. 9B).

Even where coincidence has been found as a result of the comparison by the comparator 402 and where a "1" has been indicated on the first comparison indicator 411', when coincidence is not established in the second comparator 451 the request is prohibited from being set into the storage address register 352 only for one cycle and is permitted to be set into the storage address register 352 in the next cycle (the first comparison indicator is reset by the output of the negation circuit in the case where "0" is set in the second comparison indicator) and the request (REQ) is issued to the main storage bank (FIG. 9C).

Figure 9D:
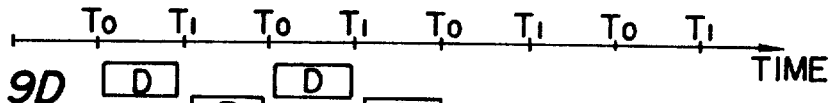

Further, where the value of the interlock bank number register 401 and the bank number are not coincident as the result of the comparison by the comparator 402, the request (REQ) to the main storage bank is permitted unconditionally and is stored in the storage address register 352 as soon as the priority level has been decided (FIG. 9D).

The above operations are summarized with reference to FIGS. 9A through 9D as explained below.

The request from the CPU 1' already stored in the request data stack 310' when the interlock from the CPU 1 has been applied has its set (REQ) into the storage address register 352 inhibited by the interlock indicator when the priority level has been decided (block P). On the other hand, it has the comparison (block $C_2$) executed by the comparator 451. The result is indicated by the second comparison indicator. If the output signal ($S_2$) is a "1" the transmission of the signal (REQ) for the set of the storage address register 352 is inhibited again, and the inhibition continues until the interlock is released. When the signal $S_2$ is a "0" the set of the storage address register 352 is permitted (the signal REQ is provided) and the main storage bank is started (FIG. 9A).

In the case of a request which the CPU 1' has issued after the interlock from the CPU 1, the request is stored in the request data stack 310', and the request command stack 320' and in parallel with the decode (block D) of the request the comparison (block $C_1$) of the bank numbers is executed by the comparator 402. The comparison result of the comparator 402 is indicated on the first comparison indicator. When the output ($S_1$) is a "1", storage (REQ) into the storage address register 352 is inhibited and the address comparison (block $C_2$) in the comparator 451 is initiated (FIGS. 9B and 9C).

The comparison result of the comparator 451 is indicated on the second comparison indicator. When the output signal ($S_2$) is a "1" (FIG. 9B), the set signal (REQ) to the storage address register 352 is inhibited until the interlock release.

On the other hand, when the signal $S_2$ is a "0" (FIG. 9C), the set signal (REQ) to the storage address register 352 is delivered in the next cycle $T_0$ and simultaneously the first comparison indicator is reset.

When, as a result of the comparison (block $C_1$) in the comparator 402, a "0" is set on the first comparison indicator (FIG. 9), the set signal (REQ) of the storage address register 352 is delivered in the cycle $T_0$ next to the decision of the priority (block P).

The comparison in the comparator 402 is the comparison with the bank number of the interlock bank number register 401. This is a length of several bits (two bits in the case where the main storage includes four banks and, at most, four bits even when the main storage banks are sixteen banks).

The number of logical stages is at most, two and the period of time required for the comparison is not considerable. In addition, the comparison is executed at the same time as the acceptance of the request from the CPU 1' by the main storage controller and it is completed while the request is being decoded so that the period of time does not substantially come into question.

When the CPU 1 does not apply the interlock the processing is executed in the same manner as in FIG. 9D and the request pitch to the main storage is one cycle at this time.

Only where the CPU 1 is executing the interlock and coincidence has been established in the comparator 402, i.e. where the CPU 1' has requested to a bank including the lock information, the request is unconditionally caused to wait for one cycle in the next cycle and is compared with the value of the interlock address register 450. Since, however, the length of the interlock region is as small as eight bytes, coincidence in the comparator 451 is rare and there is a high probability that the request to the main storage will be permitted in the next cycle.

The TS instruction executed in the CPU 1 terminates upon updata or writing of the lock information. Upon completion of writing of the lock information to the bank of the main storage, the interlock needs to be released. The command from the CPU 1 includes the "write request" and the "interlock release request".

At the time when the bank priority level of the write request has been determined, the order of the interlock release which is the output of the decoder 321 is sent through the line 328a to the interlock controller 40. By the release order the interlock controller 40 resets all the valid bit indication of the interlock bank number register 401 having the bank number, the first comparison indicators 411', 412', and 413' indicative of the result of the comparator 402, the effective bit indication of the interlock address register 450, the second comparison indicators 461', 462', and 463' indicative of the result of the comparator 451, and the interlock indicators 316', 317', and 318' belonging to the registers of the request data stack 310'.

Thus, the request of the CPU 1' references the interlock region from the cycle next to the interlock release.

As set forth above, according to the invention, in the processing of the interlock of the main storage in the multiprogrammed data processing system wherein, in the case of adopting the system of limiting the interlocked region, each reference to the main storage by the interlocked CPU there needs to be judged whether the reference is one to the region, the judgement is made in two stages, whereby reference to the interlock region is discriminated and, moreover, when no interlock is applied, the period of time of testing for the discrimination can be prevented from affecting the system performance.

Although the TS instruction has been exemplified in the embodiment of the invention, other instructions requring interlocks can also be performed with the system of the invention. The invention shall cover modifications which can be easily made by one skilled in the art within the scope of the appended claims.

What is claimed:

1. In a multiprogrammed data processing system comprising:
    means for processing data;
    main storage means for storing data; and
    main storage control means, connected to said processing means and said main storage means, for controlling the transfer of request signals and data therebetween;
    the improvement wherein said main storage control means includes:
    request register means, connected to said processing means, for storing request signals from said processing means, each of which signals comprises
        an address signal to indicate a location within said main storage means, and
        a command signal to indicate an operation to be performed by said main storage control means on data stored in said location;
    first and second interlock address register means, connected to said processing means, for respectively storing first and second parts of an interlocked address within said main storage means as first and second interlock addresses, respectively;
    first comparing means, connected to said processing means and said first interlock address register means, for determining coincidence between said first interlock address and a corresponding first part of an address of each succeeding request signal provided by said processing means to be performed;
    second comparing means, connected to said second interlock address register means and said processing means, for determining coincidence between said second interlock address and a corresponding second part of said address of said each succeeding request signal provided by said processing means; and
    transfer means, connected to said processing means, for simultaneously supplying each succeeding request signal from said processing means to said first comparing means and said request register means; and
    control means, connected to said request register means and said first and second comparing means, for transferring each succeeding request signal stored in said request register means to said main storage means in response to a non-coincidence signal provided by either of said first or second comparing means.

2. An improved data processing system according to claim 1, wherein said second comparing means is connected to said processing means by means of said request register means and said second interlock address register means, and includes means for determining coincidence between said second interlock address and the corresponding second part of said address of said each succeeding request signal stored in said request register means.

3. An improved data processing system according to claim 2, wherein said second comparing means includes means for generating a signal representative of the result of the comparison between said second interlock address and said each succeeding request signal in response to a coincidence signal provided by said first comparing signals.

4. An improved data processing system according to claim 3, wherein said control means includes means for prohibiting the transfer of said each succeeding request signal stored in said request register means in response to a coincidence signal provided by said first comparing means until a noncoincidence signal is generated by said second comparing means.

5. An improved data processing system according to claim 1, wherein:
    said processing means comprises first and second data processor units;
    said request register means comprises first and second request register means respectively connected to said first and second data processor units;
    said first interlock address register means comprises third and fourth interlock address register means, respectively connected to said first and second data processor units, for respectively storing first parts of memory addresses respectively interlocked by said first and second data processor units as third and fourth interlock addresses;
    said second interlock address register means comprises fifth and sixth interlock address register means, respectively connected to said first and second data processor units, for respectively storing second parts of memory addresses interlocked respectively by said first and second data processor units;
    said first comparing means comprises third and fourth comparing means, said third comparing means being connected to said second data processor unit and said third interlock address register means, and including means for determining coincidence between said third interlock address and the first part of an address signal of each succeeding request signal provided by said second data processor unit, and said fourth comparing means being connected to said first data processor unit and said fourth interlock address register means, and including means for determining coincidence between said fourth interlock address and the first part of an address signal of each succeeding request signal provided by said first data processor unit;
    said second comparing means comprises fifth and sixth comparing means, said fifth comparing means being connected to said second data processor unit and said fifth interlock address register means for determining coincidence between said fifth interlock address and the second part of an address signal of each succeeding request signal provided by said second data processor unit, and said sixth comparing means being connected to said first data processor unit and said sixth interlock address register means for determining coincidence between said sixth interlock address and the second part of each succeeding request signal provided by said first data processor unit;
    said transfer means comprises means, connected to said first data processor unit, for simultaneously supplying said each succeeding request signal from said first data processor unit to said first request register means and said fourth comparing means, and means, connected to said second data processor unit, for simultaneously supplying each succeeding request signal from said second processor means to said second request register means and said third comparing means; and said control means is connected to said third to sixth comparing means and said first and second request register means, said control means transferring said each succeeding request signal stored in said first request register means in response to a non-coincidence signal provided by either said fourth or said sixth comparing means and said control means transferring said succeeding request signal stored in said second request register means in response to a non-coincidence signal provided by either said third or fifth comparing means.

6. An improved data processing system according to claim 5, wherein:

said third comparing means is connected to said second processing means by means of said second request register means and said third interlock address register means, and includes means for determining coincidence between said first part of each succeeding request signal stored in said second request register means and said third interlock address; and said fourth comparing means is connected to said first processing means by means of said first request register means, and includes means for determining coincidence between said first part of said each succeeding request signal stored in said first request register means and said fourth interlock address.

7. An improved data processing system according to claim 6, wherein:

said fifth comparing means includes means for generating a signal representative of the result of the comparison between said fifth interlock address and each succeeding request signal stored in said second request register means, in response to a coincidence signal provided by said third comparing means; and said sixth comparing means includes means for generating a signal representative of the result of the comparison between said sixth interlock address and each succeeding request signal stored in said first request register means, in response to a coincidence signal provided by said fourth comparing means.

8. An improved data processing system according to claim 7, wherein said control means includes means for prohibiting the respective transfer of succeeding request signals stored in said first and second request register means, respectively, in response to coincidence signals, respectively provided by said fourth and third comparing means until non-coincidence signals are respectively provided by said sixth and fifth comparing means.

9. An improved data processing system according to claim 5, wherein the first part of an address signal comprises a smaller number of bits than the second part of an address signal.

10. An improved data processing system according to claim 9, wherein:

said main storage means comprises a plurality of storage devices;

each address signal of each request signal comprises a device number signal to indicate one of said storage devices and a location within said one of storage devices indicated by said device number signal;

the first parts of address signals are device number signals; and the second parts of address signals are location signals.

11. An improved data processing system according to claim 8, wherein:

said first and second request register means respectively store a plurality of succeeding request signals respectively provided by said first and second data processor units; and said control means further comprises first and second selecting means for respectively selecting storage locations within said first and second request register means to store respectively each succeeding request signal provided by said first and second processing means, and respectively selecting storage locations within said first request register means, to provide respectively a request signal stored therein to said sixth and fifth comparing means.

12. An improved data processing system according to claim 10 wherein said third to sixth comparing means respectively comprise third, fourth, fifth, and sixth indication means for respectively storing the results of comparisons by said third, fourth, fifth, and sixth comparing means.

13. In a multiprogrammed data processing system comprising:

means for processing data;

main storage means for storing data; and main storage control means, connected to said processing means and said main storage means, for controlling the transfer of request signals and data therebetween;

the improvement wherein said main storage control means includes:

a plurality of request register means, connected to said processing means, for storing request signals from said processing means, each of which signals comprises an address signal to indicate a location within said main storage means and a command signal to indicate an operation to be performed by said main storage control means on data stored in said location;

interlock address register means, connected to said processing means, for storing an interlocked address within said main storage means;

comparing means, connected to said data processing means and said interlock address register means, for determining the coincidence between said interlock address and an address of each succeeding request signal provided by said processing means to be performed;

a plurality of first indication means for respectively storing the results of comparison by said comparing means;

transfer means, connected to said data processing means, for simultaneously supplying each succeeding request signal from said processing means to said comparing means and said plurality of request register means;

first selection means for storing each succeeding request signal from said processing means in a selected one of said plurality of request register means and for storing the result of comparison by said comparing means in one of said plurality of indication means; and control means, connected to said request register means and said first indication means, for controlling the transfer of each succeeding request signal stored in said request register means to said main storage means, said control means including second selection means for selecting one of said plurality of request register means and a corresponding one of said plurality of indication means and gate means for transferring a request signal from said selected request means in response to a non-coincidence signal from said selected indication means.

14. An improved data processing system according to claim 13, wherein said comparing means includes means for determining coincidence between a first part of said interlock address and a corresponding first part of each succeeding request signal.

15. An improved data processing system according to claim 14, wherein:

said control means further includes second comparing means, connected to said interlock address register means and said request register means, for determining coincidence between a second part of said interlock address and a corresponding second part of said request signal from said one of said request register means selected by said second selection means; and said gate means transfers said request signal in response to a non-coincidence signal from said second comparing means.

16. An improved data processing system according to claim 15, wherein:

said control means further includes a plurality of second indication means respectively connected to said second comparing means and to corresponding one of said plurality of first indication means for respectively storing results of comparison by said second comparing means; and said gate means is responsive to signals provided by said second indication means.

* * * * *